(12) United States Patent
Matsuo et al.

(10) Patent No.: US 6,268,455 B1
(45) Date of Patent: Jul. 31, 2001

(54) MERCAPTOMETHYLPHENYL GROUP-CONTAINING DIORGANOPOLYSILOXANE AND PRODUCTION PROCESS FOR THE SAME

(75) Inventors: Takashi Matsuo, Kagoshima; Youichi Kimae, Kumamoto, both of (JP)

(73) Assignee: Chisso Corporation, Osaka (JP)

(*) Notice: Subject to any disclaimer, the term of this patent is extended or adjusted under 35 U.S.C. 154(b) by 0 days.

(21) Appl. No.: 09/521,462

(22) Filed: Mar. 8, 2000

(30) Foreign Application Priority Data

Mar. 19, 1999 (JP) .................................................. 11-076215

(51) Int. Cl.$^7$ .................................................. C08G 77/28
(52) U.S. Cl. .................. 528/30; 528/25; 568/61; 568/20; 556/429
(58) Field of Search .................. 528/30, 25; 568/61, 568/20; 556/429

(56) References Cited

U.S. PATENT DOCUMENTS 5,416,230 * 5/1995 Jung et al. .
5,436,358 * 7/1995 Jung et al. .
5,844,060 * 12/1998 Furyya et al. .

* cited by examiner

Primary Examiner—Robert Dawson
Assistant Examiner—Kuo-Liang Peng
(74) Attorney, Agent, or Firm—McDermott, Will & Emery

(57) ABSTRACT

Provided is a novel mercaptomethylphenyl group-containing diorganopolysiloxane compound represented by the following Formula (1):

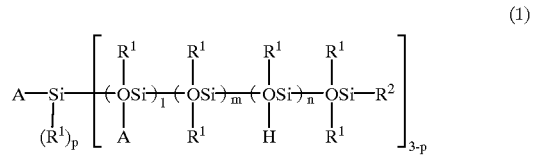

wherein $R^1$ represents methyl or phenyl; $R^2$ represents a linear or branched alkyl group having 1 to 6 carbon atoms, a phenyl group or A; l represents an integer of 0 to 500; m represents an integer of 0 to 1,000; n represents an integer of 0 to 500; p represents an integer of 0 to 2; and A is a group represented by Formula (2):

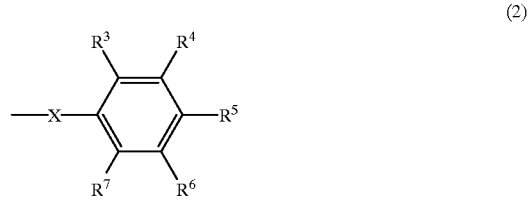

wherein X represents a linear or branched alkylene group having 2 to 20 carbon atoms; at least one of $R^3$, $R^4$, $R^5$, $R^6$ and $R^7$ represents mercaptomethyl, and the remaining groups each represent a hydrogen atom or a linear or branched alkyl group having 1 to 20 carbon atoms.

6 Claims, 13 Drawing Sheets

MERCAPTOMETHYLPHENYL GROUP-CONTAINING DIORGANOPOLYSILOXANE AND PRODUCTION PROCESS FOR THE SAME

BACKGROUND OF THE INVENTION

1. Field of the Invention

The present invention relates to mercaptomethylphenyl group-containing diorganopolysiloxane and a production process for the same. More specifically, the present invention relates to mercaptomethylphenyl group-containing diorganopolysiloxane containing a mercaptomethylphenyl group and having an alkyl group, and a production process for the same.

2. Description of the Related Art

Diorganopolysiloxanes have so far been blended with organic resins for the purposes of providing the organic resins with properties such as a water repellency, a low adhesion, a excellent lubricity ability and the like. However, when diorganopolysiloxanes to be used do not have organic functional groups, caused are elimination of the diorganopolysiloxanes from the organic resins blended with the diorganopolysiloxanes by washing and bleeding-out of the diorganopolysiloxanes from the organic resins attributable to a low compatibility of the diorganopolysiloxanes with various organic resins, and thus the characteristics described above endowed to the organic resins have been temporary and not permanent.

On the other hand, when diorganopolysiloxanes having organic functional groups are used, a reactivity of the organic functional groups can be utilized to allow the diorganopolysiloxanes to be chemically bonded to various organic resins, so that the organic resins to be bonded therewith can be provided with properties (a water repellency, a low adhesion, a excellent lubricity ability and the like) which are inherent to the diorganopolysiloxanes without reducing the intrinsic characteristics of the resins.

This method is not carried out merely by mixing, and therefore a problem of bleeding-out and a reduction in various properties caused by washing are not observed. Accordingly, it can be said that various properties provided by this method are persistent effects. Thus, diorganopolysiloxanes having organic functional groups are useful as a modifier for organic resins.

Known as the diorganopolysiloxane having an organic functional group are amino-modified diorganopolysiloxanes, epoxy-modified diorganopolysiloxanes, alcohol-modified diorganopolysiloxanes, methacryloxy-modified diorganopolysiloxanes and carboxyl-modified diorgahopolysiloxanes.

When these diorganopolysiloxanes are chemically bonded to organic resins, the kinds of the organic functional groups on a diorganopolysiloxane side depend on the kinds of the organic functional groups on an organic resin side. That is, the organic functional groups on the diorganopolysiloxane side had to be organic functional groups which react with the organic functional groups on the organic resin side.

Accordingly, in order to provide organic resins having various organic functional groups with properties such as a water repellency, a low adhesion and a excellent lubricity ability which are inherent to diorganopolysiloxanes, diorganopolysiloxanes having various organic functional groups corresponding thereto have been requested to be developed.

On the other hand, when a block copolymer prepared by using radical polymerization for forming the skeleton is synthesized, a polymerizing method for the same includes (1) polymerization carried out with a high-molecular-weight initiator, (2) living radical polymerization and (3) reaction between end-functional prepolymers. Among them, in order to synthesize a block copolymer by reaction between end-functional prepolymers, suitable end-functional prepolymers are required, so that useful prepolymers have been desired.

SUMMARY OF THE INVENTION

Among a number of organic functional groups, a mercaptomethylphenyl group forms sulfide by reacting with an alkylating agent under a basic condition or reacting with alcohol under an acid condition, and therefore the present inventors considered that if mercaptomethylphenyl group-containing diorganopolysiloxane (hereinafter referred to as mercapto-modified silicone) in which a mercaptomethylphenyl group was introduced into a single end, both ends or a side chain of diorganopolysiloxane would be used, diorganopolysiloxane could be introduced into an organic resin having a hydroxyl residue, for example, polyvinyl alcohol and copolymers of hydroxyethyl methacrylate by making use of the above reaction, whereby a graft copolymer could be prepared.

Further, a mercaptomethylphenyl group has a large chain transfer coefficient and is immediately turned into a radical in the presence of a radical polymerization initiator, so that it can undergo radical polymerization with various monomers. Accordingly, the present inventors considered that mercapto-modified silicone would be useful as an end-functional prepolymer.

For example, when methacrylic esters are polymerized with a radical polymerization initiator, the addition of diorganopolysiloxane having a mercaptomethylphenyl group at a single end turns immediately the mercaptomethylphenyl group into a radical, which becomes a radical polymerization initiator for methacrylic esters. The present inventors considered that this process would make it possible to synthesize an AB type block copolymer of diorganopolysiloxane with poly(methacrylic acid ester).

However, mercapto-modified silicone has not so far been known.

Intensive researches continued by the present inventors based on a point of view that mercapto-modified silicone would be useful as a raw material for a graft copolymer and a block copolymer have resulted in finding that if mercaptomethylphenyl group-containing diorganopolysiloxane containing a mercaptomethylphenyl group and having an alkyl group would be use, diorganopolysiloxane could be introduced into an organic resin having a hydroxyl residue to prepare a graft copolymer and that an AB type block copolymer of the above diorganopolysiloxane with poly(methacrylic ester) would be able to be synthesized, and thus the present invention has been completed based on this knowledge.

The present invention shall be explained below in detail.

The first invention relates to a mercaptomethylphenyl group-containing diorganopolysiloxane compound represented by the following Formula (1):

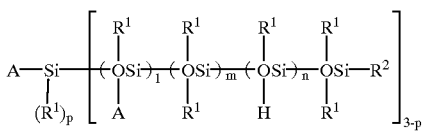

(1)

wherein $R^1$ represents methyl or phenyl; $R^2$ represents a linear or branched alkyl group having 1 to 6 carbon atoms, a phenyl group or A; l represents an integer of 0 to 500; m represents an integer of 0 to 1,000; n represents an integer of 0 to 500; p represents an integer of 0 to 2; and A is a group represented by Formula (2):

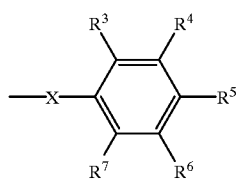

(2)

wherein X represents a linear or branched alkylene group having 2 to 20 carbon atoms; at least one of $R^3$, $R^4$, $R^5$, $R^6$ and $R^7$ represents mercaptomethyl, and the remaining groups represent a hydrogen atom or a linear or branched alkyl group having 1 to 20 carbon atoms.

DESCRIPTION OF THE PREFERRED EMBODIMENTS

Figure 1:
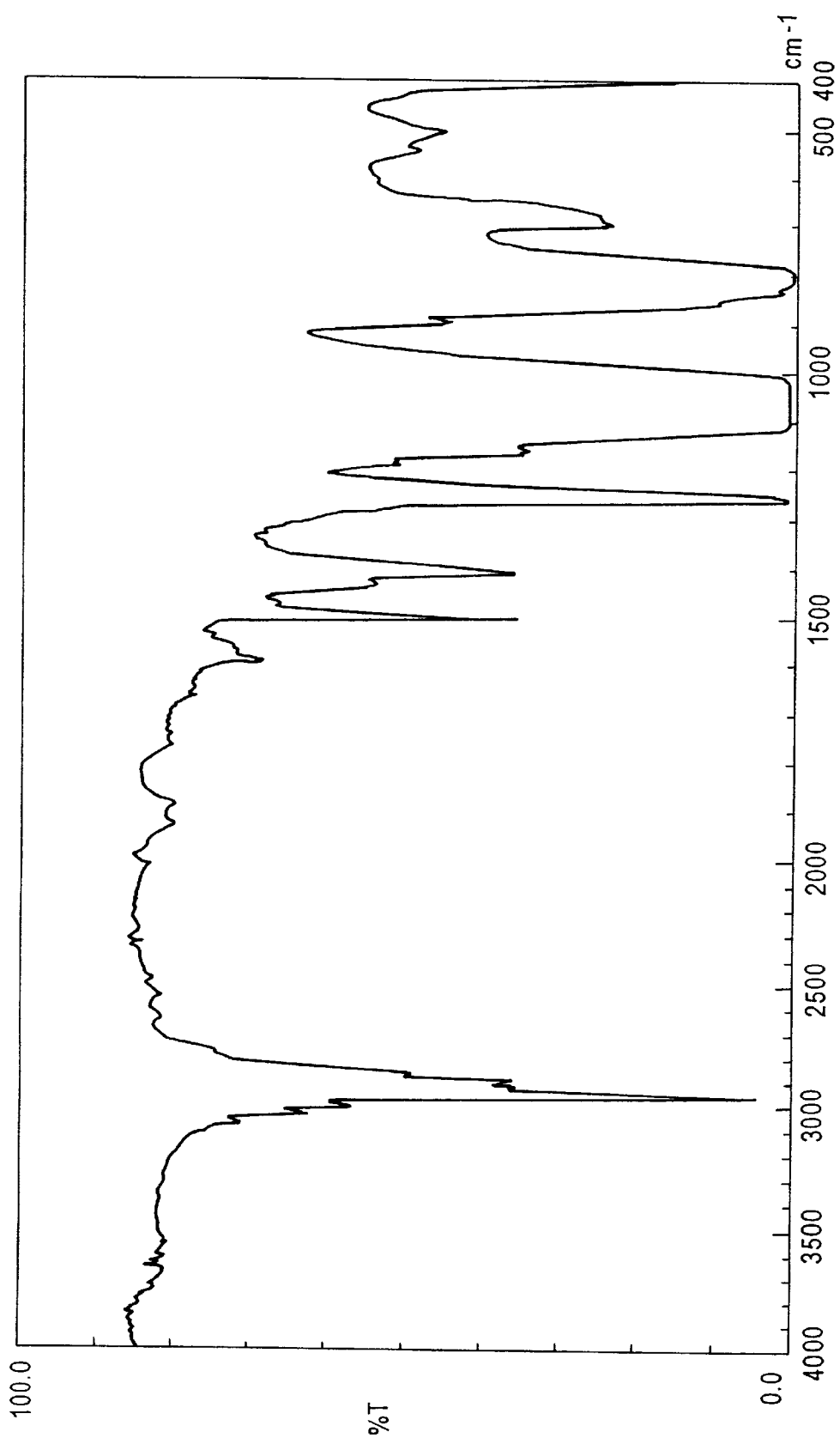
FIG. 1 shows an IR chart of both ends-mercaptomethylphenyl group-containing polysiloxane prepared in Example 1 according to the present invention.

Respective siloxane units in the siloxane skeleton in Formula (1) may be arranged either in a random state or a block state.

When the compound represented by Formula (1) is single end-mercaptomethylphenyl group-containing diorganopolysiloxane, $R^2$ is a linear or branched alkyl group having 1 to 6 carbon atoms or a phenyl group, p is 2 and l is 0.

This single end-mercaptomethylphenyl group-containing diorganopolysiloxane has preferably a number average molecular weight falling in a range of 500 to 200,000. When the number average molecular weight is 500 or less, the properties of diorganopolysiloxane tends to be less likely to be revealed, and when the number average molecular weight is 200,000 or more, it is relatively difficult to obtain the corresponding raw materials.

When the compound represented by Formula (1) is both ends-mercaptomethylphenyl group-containing diorganopolysiloxane, $R^2$ is A, p is 2 and l is 0.

This both ends-mercaptomethylphenyl group-containing diorganopolysiloxane has preferably a number average molecular weight falling in a range of 500 to 200,000. When the number average molecular weight is 500 or less, the properties of diorganopolysiloxane tends to be less likely to be revealed, and when the number average molecular weight is 200,000 or more, it is relatively difficult to obtain the corresponding raw materials.

The second invention relates to a production process for a mercaptomethylphenyl group-containing diorganopolysiloxane compound characterized by reacting a chloromethylphenyl group-containing diorganopolysiloxane compound represented by the following Formula (3) with a mercapto-providing agent:

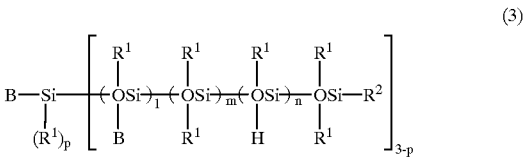

(3)

wherein $R^1$ represents methyl or phenyl; $R^2$ represents a linear or branched alkyl group having 1 to 6 carbon atoms, a phenyl group or B; l represents an integer of 0 to 500; m represents an integer of 0 to 1,000; n represents an integer of 0 to 500; p represents an integer of 0 to 2; and B is a group represented by Formula (4):

(4)

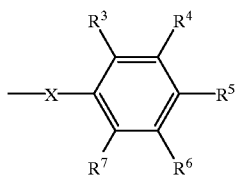

wherein X represents a linear or branched alkylene group having 2 to 20 carbon atoms; at least one of $R^3$, $R^4$, $R^5$, $R^6$ and $R^7$ represents chloromethyl, and the remaining groups each represent a hydrogen atom or a linear or branched alkyl group having 1 to 20 carbon atoms.

Respective siloxane units in the siloxane skeleton in Formula (3) may be arranged either in a random state or a block state.

When producing a single end-mercaptomethylphenyl group-containing diorganopolysiloxane compound having a number average molecular weight of 500 to 200,000, the compound represented by Formula (3) is preferably a single end-chloromethylphenyl group-containing diorganopolysiloxane compound in which $R^2$ is a linear or branched alkyl group having 1 to 6 carbon atoms or a phenyl group; p is 2; l is 0; and the number average molecular weight is 500 to 200,000.

On the other hand, when a producing both ends-mercaptomethylphenyl group-containing diorganopolysiloxane compound having a number average molecular weight of 500 to 200,000, the compound represented by Formula (3) is preferably a both ends-chloromethylphenyl group-containing diorganopolysiloxane compound in which $R^2$ is B; p is 2; l is 0; and the number average molecular weight is 500 to 200,000.

Two examples of a process for producing the chloromethylphenyl group-containing diorganopolysiloxane compound represented by Formula (3) shall be given below.

The first process thereof includes a process in which a compound represented by Formula (5) is reacted with a compound represented by Formula (6) in the presence of a hydrosilation reaction catalyst:

(5)

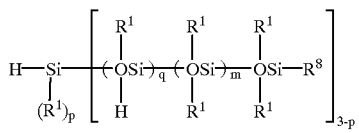

wherein $R^1$ represents methyl or phenyl; $R^8$ represents a linear or branched alkyl group having 1 to 6 carbon atoms, a phenyl group or a hydrogen atom; q represents an integer of 0 to 1,000; m represents an integer of 0 to 1,000; and p represents an integer of 0 to 2:

(6)

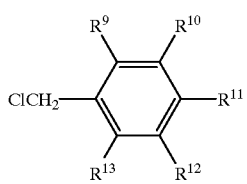

wherein at least one of $R^9$, $R^{10}$, $R^{11}$, $R^{12}$ and $R^{13}$ represents a linear or branched alkylene group with 2 to 20 carbon atoms having a carbon-carbon double bond, and the remaining groups each represent a hydrogen atom or a linear or branched alkyl group having 1 to 20 carbon atoms.

The SiH group-containing organic silicone compound represented by Formula (5) can be synthesized by cohydrolysis, equilibration or strong basic living polymerization of chlorosilanes. The cohydrolysis is reaction in which monochlorosilane represented by the following Formula (7) is reacted with dichlorosilane represented by the following Formula (8) in a solvent containing water to eliminate hydrogen chloride (reaction equation (1)), and resulting hydrogen chloride can be captured by a base if necessary:

$$R^{14}R^1{}_2SiCl \qquad (7)$$

wherein $R^1$ represents methyl or phenyl, and $R^{14}$ represents a linear or branched alkyl group having 1 to 6 carbon atoms or a phenyl group or a hydrogen atom:

$$R^{15}R^1SiCl_2 \qquad (8)$$

wherein $R^1$ represents methyl or phenyl, and $R^{15}$ represents a linear or branched alkyl group having 1 to 6 carbon atoms or a phenyl group or a hydrogen atom:

$$2R^{14}R^1{}_2SiCl + x\ R^{15}\ R^1SiCl_2 + H_2O \rightarrow$$
$$R^{14}R^1{}_2SiO(R^{15}R^1SiO)xSiR^{14}R^1{}_2 + HCl \qquad \text{Reaction equation (1)}$$

wherein at least of $R^{14}$ and $R^{15}$ is a hydrogen atom.

Polydialkylsiloxane having a T structure can be produced as well by allowing trichlorosilane represented by Formula (9) to coexist in the reaction equation (1):

$$R^{16}SiCl_3 \qquad (9)$$

wherein $R^{16}$ represents methyl or phenyl or a hydrogen atom.

The equilibration is reaction in which disiloxane represented by the following Formula (10) is polymerized with cyclopolysiloxane represented by Formula (11) in the presence of an acid catalyst or a basic catalyst (reaction equation (2)):

$$(R^{17}R^1{}_2Si)_2O \qquad (10)$$

wherein $R^1$ represents methyl or phenyl, and $R^{17}$ represents a linear or branched alkyl group having 1 to 6 carbon atoms or a phenyl group or a hydrogen atom:

(11)

wherein $R^1$ represents methyl or phenyl; $R^{18}$ represents a linear or branched alkyl group having 1 to 6 carbon atoms or a phenyl group or a hydrogen atom; t represents an integer of 0 to 6; u represents an integer of 0 to 6; and t+u is an integer of 3 to 10:

Reaction equation (2)

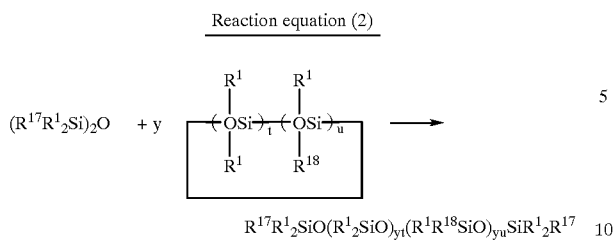

wherein at least of $R^{17}$ and $R^{18}$ is a hydrogen atom.

The strong basic living polymerization is reaction in which cyclopolysiloxane represented by the following Formula (12) is polymerized using an organic alkaline metal compound as an initiator and then the terminal thereof is sealed with chlorosilane represented by the following Formula (13):

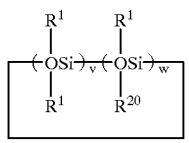
(12)

wherein $R^1$ represents methyl or phenyl; $R^{20}$ represents a linear or branched alkyl group having 1 to 6 carbon atoms or a phenyl group or a hydrogen atom; v represents an integer of 0 to 3; w represents an integer of 0 to 3; and v+w is an integer of 3 to 6:

$$R^{21}R^1{}_2SiCl \quad (13)$$

wherein $R^1$ represents methyl or phenyl, and $R^{21}$ represents a linear or branched alkyl group having 6 carbon atoms or less or a phenyl group or a hydrogen atom:

Reaction equation (3)

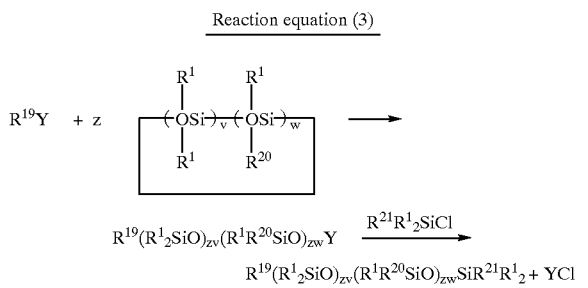

wherein at least of $R^{20}$ and $R^{21}$ is a hydrogen atom, and Y represents an alkaline metal atom.

Polydialkylsiloxane having a T structure can be produced as well by allowing trichlorosilane represented by Formula (9) to coexist in the reaction equation (3).

The compound represented by Formula (6) includes:

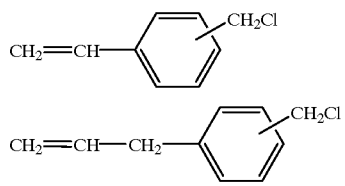

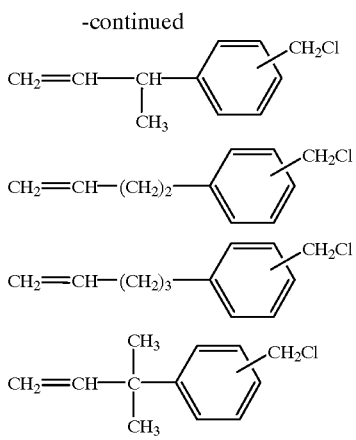

In this first process, a catalyst used for hydrosilation can usually be used. Transit metal catalysts can be used for this catalyst. To be specific, platinum, rhodium, iridium, ruthenium, palladium, molybdenum and manganese can be given as examples thereof. They can be used in any of a form of a homogeneous system catalyst in which they are dissolved in solvents, a form of a carried catalyst system in which they are carried on carbon, silica and the like and a form of a catalyst system in which phosphines, amines, potassium acetate and the like are used as promoters.

In this process, a reaction solvent is not necessarily required, but a suitable solvent may be used if necessary. Any ones can be used as such solvent as long as they do not prevent the reaction, and capable of being given as examples thereof are aliphatic hydrocarbon solvents such as hexane and heptane, aromatic hydrocarbon solvents such as benzene, toluene and xylene, ether base solvents such as diethyl ether, THF and dioxane, halogenated hydrocarbon solvents such as methylene chloride and carbon tetrachloride, alcohol base solvents such as methanol, ethanol and propanol, and water. These solvents may be used alone or in combination of a plurality thereof.

The reaction temperature in this reaction shall not specifically be restricted and is usually preferably not higher than the boiling point of the solvent. When the solvent is not used, the reaction is carried out preferably at 0 to 250° C., more preferably at 20 to 120° C. considering the profitability.

The second process for producing the chloromethylphenyl group-containing diorganopolysiloxane compound represented by Formula (3) includes a process in which a both ends-chloromethylphenyl group-containing diorganopolysiloxane compound represented by the following Formula (14) is reacted with a compound represented by the following Formula (15) in the presence of an acid catalyst to obtain a both ends-chloromethylphenyl group-containing diorganopolysiloxane compound having a number average molecular weight falling in a range of 500 to 200,000:

(14)

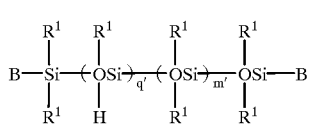

wherein $R^1$ represents methyl or phenyl; q' represents an integer of 0 to 1,000; m' represents an integer of 0 to 1,000; and B is a group represented by Formula (4):

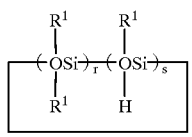
(15)

wherein $R^1$ represents methyl or phenyl; r represents an integer of 0 to 6; s represents an integer of 0 to 6; and r+s is an integer of 3 to 10:

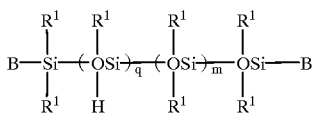
(16)

wherein $R^1$ represents methyl or phenyl; q represents an integer of 0 to 1,000; m represents an integer of 0 to 1,000; B is a group represented by Formula (4); provided that $q>=q'$ and $m>=m'$.

In this production process, catalysts usually used for the equilibration reaction can be used. To be specific, capable of being given as examples of these catalysts are sulfuric acid, hydrochloric acid, phosphoric acid, activated clay, iron chloride, boric acid, trifluoroacetic acid, acid ion exchange resins and the like.

In the present reaction, a solvent is not necessarily required, but a suitable solvent may be used if necessary. Any ones can be used as such solvent as long as they do not prevent the reaction, and capable of being given as examples thereof are aliphatic hydrocarbon solvents such as hexane and heptane, aromatic hydrocarbon solvents such as benzene, toluene and xylene, ether base solvents such as diethyl ether, THF and dioxane, and halogenated hydrocarbon solvents such as methylene chloride and carbon tetrachloride. These solvents may be used alone or in combination of a plurality thereof.

The reaction temperature in this process shall not specifically be restricted and is usually preferably not higher than the boiling point of the solvent. When the solvent is not used, the reaction is carried out preferably at 0 to 250° C., more preferably at 20 to 120° C. considering the profitability.

Publicly known compounds can be used for the mercapto-providing agent which is essential in the production process of the present invention. To be specific, included are hydrogen sulfide, sodium sulfide, potassium sulfide, sodium hydrogensulfide, potassium hydrogensulfide, sodium thiocyanate, potassium thiocyanate, thiourea, potassium t-butyldithiocarbonate, $NaBH_2S_3$, N,N-dimethylthioformamide, thioformanilide, sodium N,N-dimethyldithiocarbamate, potassium N,N-dimethyldithiocarbamate, sodium ethylxanthate, potassium ethylxanthate, sodium methylxanthate, potassium methylxanthate, sodium thiosaccharate, potassium thiosaccharate, sodium thioacetate and potassium thioacetate.

Preferred from viewpoints of an easiness in obtaining, a convenience in handling and a yield are sodium sulfide, potassium sulfide, sodium hydrogensulfide, potassium hydrogensulfide, thiourea, potassium t-butyldithiocarbonate, $NaBH_2S_3$, N,N-dimethylthioformamide, sodium N,N-dimethyldithiocarbamate and potassium N,N-dimethyldithiocarbamate. Among them, sodium hydrogensulfide is particularly preferred.

In the production process of the present invention, a mole ratio of the chloromethylphenyl group-containing diorganopolysiloxane compound to the mercapto-providing agent is preferably 1:1 to 1:10, and in order to completely turn the chloromethylphenyl group-containing diorganopolysiloxane compound into the mercapto compound and inhibit side reactions, it is more preferably 1:1 to 1:2.

A reaction solvent is not specifically required, but if it is used, almost all solvents in which the chloromethylphenyl group-containing diorganopolysiloxane compound and the mercapto-providing agent can be dissolved can be used. To be specific, methanol, ethanol, 1-propanol, 2-propanol, 1-butanol, 2-butanol, acetone and the like can be used. When sodium hydrogensulfide is used for the mercapto-providing agent, alcohol base solvents are preferred, and from a viewpoint of removing efficiently sodium chloride which is by-produced by the reaction, 1-propanol, 2-propanol, 1-butanol and 2-butanol are particularly preferred. When the reaction solvent is used, preferably used is such amount of the solvent that a concentration of siloxane falls in a range of 5 to 50% by weight.

The reaction temperature is preferably 20 to 80° C. when sodium hydrogensulfide is used for the mercapto-providing agent. The too low reaction temperature delays a reaction rate of turning into mercapto, so that an effect exerted by moisture can not be neglected. On the other hand, the too high reaction temperature allows sodium sulfide and hydrogen sulfide to be produced from sodium hydrogensulfide as by-product, which results in producing a by-product of sulfidesiloxane due to sodium sulfide.

The reaction results in producing sodium chloride as by-product, but this can be removed by a method such as filtration, washing with water and the like.

EXAMPLES

The present invention shall be explained below in detail with reference to examples, but the present invention shall not be restricted to these examples.

In the present examples, production examples of chloromethylphenyl group-containing dimethylpolysiloxanes used in the respective examples were shown as reference examples.

The viscosity was measured by means of a Canon Fenske viscometer according to JIS Z 8803 (viscosity measuring method). The mercapto value was measured according to JIS K 0068 (method for measuring moisture content of chemicals). The number average molecular weight and the dispersion were determined by gel permeation chromatography (GPC), wherein the column used was Shodex KF-804LX2; the column temperature was 40° C.; the detector was RI; and the mobile phase was toluene.

Reference Example 1

Production of Both Ends-Chloromethylphenyl Group-Containing Dimethylpolysiloxane Having a Number Average Molecular Weight of About 1,000:

A four neck flask of 300 ml equipped with a magnetic stirrer, a cooling tube, a thermometer and a dropping funnel was charged with 100 g of dimethylpolysiloxane with a number average molecular weight of 500 having SiH groups at both ends, and dry air was blown thereinto. The solution temperature was elevated up to 60° C., and 5 micro liter of a platinum catalyst was put therein. Then, a homogeneous solution of 3.9 g of chloromethylstyrene and 0.3 g of t-butylcatechol was dropwise added from the dropping funnel in 2 hours. The reaction liquid was ripened for one hour and then cooled down to distil off unreacted chloromethylstyrene and volatile matters by means of an evaporator, whereby 149 g of a brown, transparent liquid was obtained.

It was confirmed from the analytical results of NMR, IR and GPC that this product was both ends-chloromethylphenyl group-containing dimethypolysiloxane having a number average molecular weight of about 1,000.

Example 1

Production of Both Ends-Mercaptomethylphenyl Group-Containing Dimethylpolysiloxane Having a Number Average Molecular Weight of About 1,000:

A 500 ml flask equipped with a magnetic stirrer, a cooling tube and a thermometer was charged with 50 g of the both ends-chloromethylphenyl group-containing dimethylpolysiloxane having a number average molecular weight of about 1,000 described in Reference Example 1, 9.4 g of sodium hydrogensulfide and 150 g of 2-propanol. This mixture was heated to 40° C. and stirred for 24 hours while heating at the same temperature.

Turbidity produced in the reaction liquid was filtered off, and 2-propanol was distilled off from the filtrate under reduced pressure by means of an evaporator. After finishing distillation, resulting turbidity was filtered off to obtain 45.2 g of a reddish yellow, transparent liquid.

Figure 2:
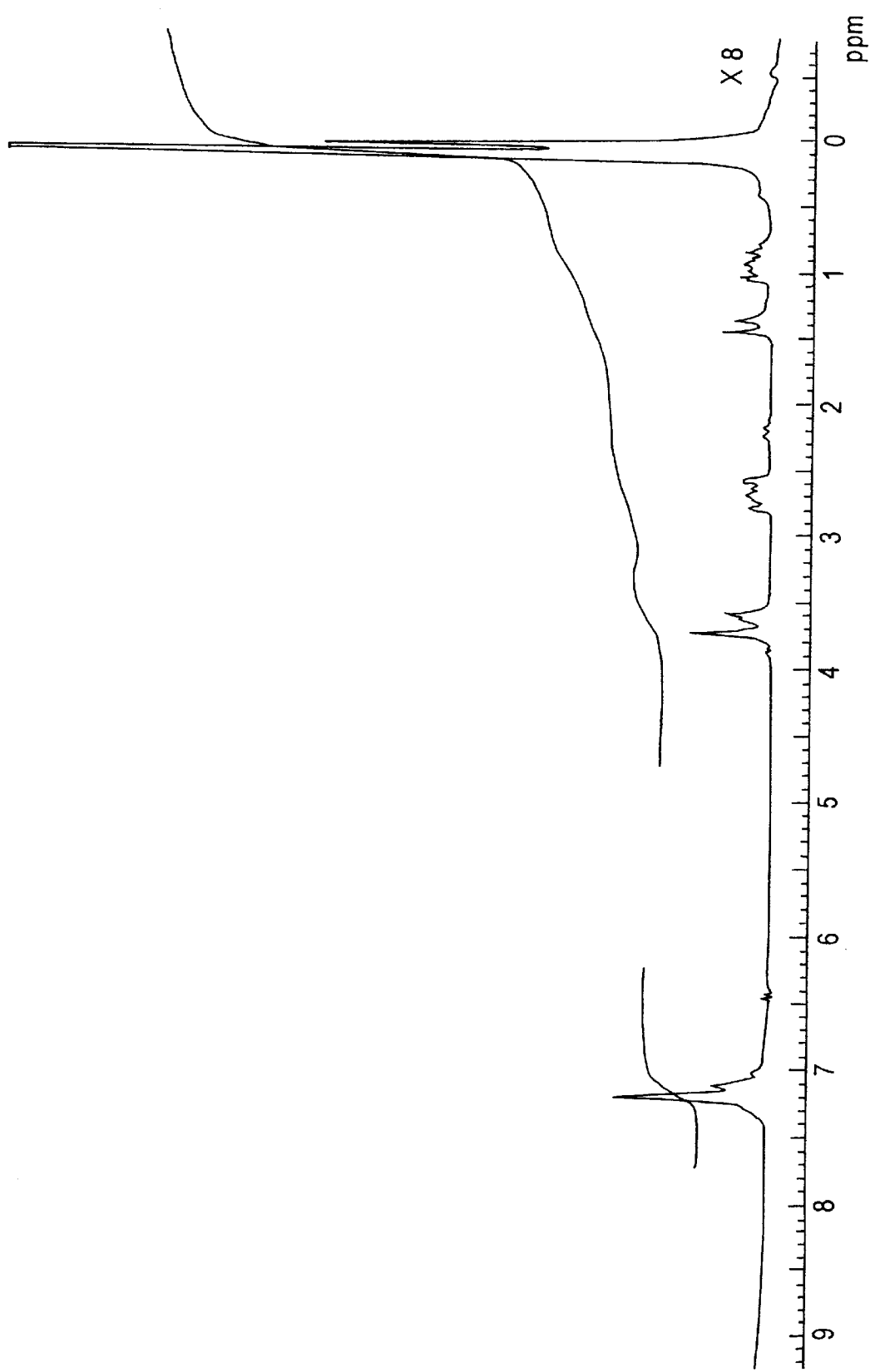
FIG. 2 shows a $^1$H-NMR chart of both ends-mercaptomethylphenyl group-containing polysiloxane prepared in Example 1 according to the present invention.
Figure 3:
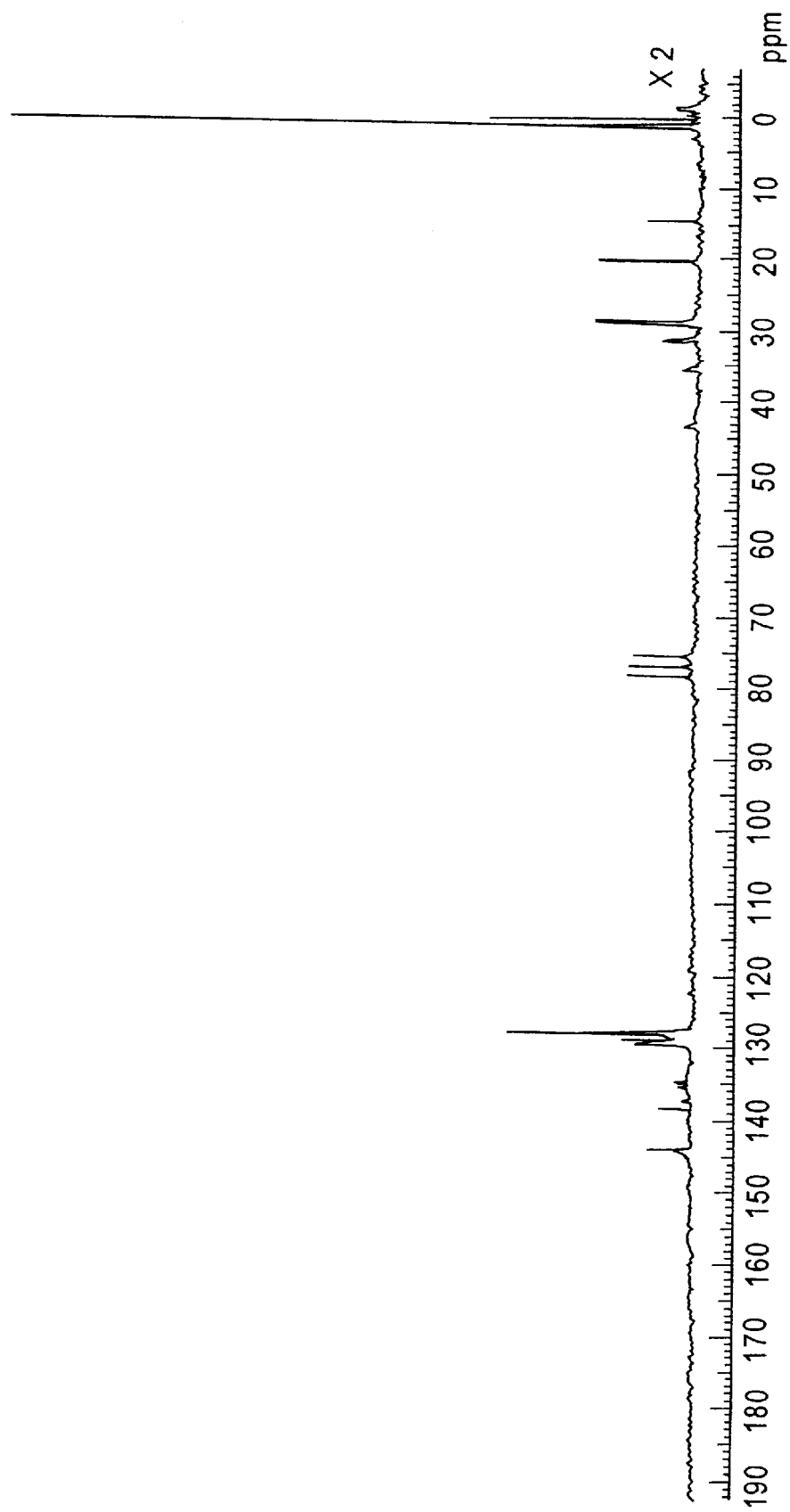
FIG. 3 shows a $^{13}$C-NMR chart of both ends-mercaptomethylphenyl group-containing polysiloxane prepared in Example 1 according to the present invention.

This product had a viscosity of 209 (cSt/25° C.), a mercapto value of 841 g/mol, a sulfur content of 4.57 wt %, a number average molecular weight of 1350 which was reduced to polystyrene and a dispersion degree of 1.12. It was confirmed from an IR chart shown in FIG. 1, a $^1$H-NMR chart shown in FIG. 2 and a $^{13}$C-NMR chart shown in FIG. 3 that this product was both ends-mercaptomethylphenyl group-containing dimethylpolysiloxane.

Reference Example 2

Production of Both Ends-Chloromethylphenyl Group-Containing Dimethylpolysiloxane Having a Number Average Molecular Weight of About 5,000:

A four neck flask of 300 ml equipped with a magnetic stirrer, a cooling tube, a thermometer and a dropping funnel was charged with 1 g of an acid ion exchange resin DIAION RCP 160M (manufactured by Mitsubishi Chemical Co., Ltd.) and 50.8 g of toluene and azeotropically dewatered. After leaving the flask cooling down to a room temperature, put therein were 40.7 g of octamethylcyclotetrasiloxane and 10 g of the both ends-chloromethylphenyl group-containing dimethylpolysiloxane having a number average molecular weight of about 1,000 obtained in Reference Example 1, and the temperature was elevated up to 70° C. to continue the reaction for 4 hours. After cooling down the reaction liquid, the acid ion exchange resin was filtered off. The solvent and volatile matters were distilled off under reduced pressure by means of an evaporator to obtain 42.8 g of a pale yellow, transparent liquid.

It was confirmed from the analytical results of NMR, IR and GPC that this product was both ends-chloromethylphenyl group-containing dimethypolysiloxane having a number average molecular weight of about 5,000.

Example 2

Production of Both Ends-Mercaptomethylphenyl Group-Containing Dimethylpolysiloxane Having a Number Average Molecular Weight of About 5,000:

A 200 ml flask equipped with a magnetic stirrer, a cooling tube and a dropping funnel was charged with 20 g of the both ends-chloromethylphenyl group-containing dimethylpolysiloxane having a number average molecular weight of about 5,000 described in Reference Example 2, 0.56 g of sodium hydrogensulfide and 60 g of 2-propanol. This mixture was heated to 40° C. and stirred for 24 hours while heating at the same temperature.

Turbidity produced in the reaction liquid was filtered off, and 2-propanol was distilled off from the filtrate under reduced pressure by means of an evaporator. After finishing distillation, resulting turbidity was filtered off to obtain 18.9 g of a slightly yellowish, transparent liquid.

Figure 4:
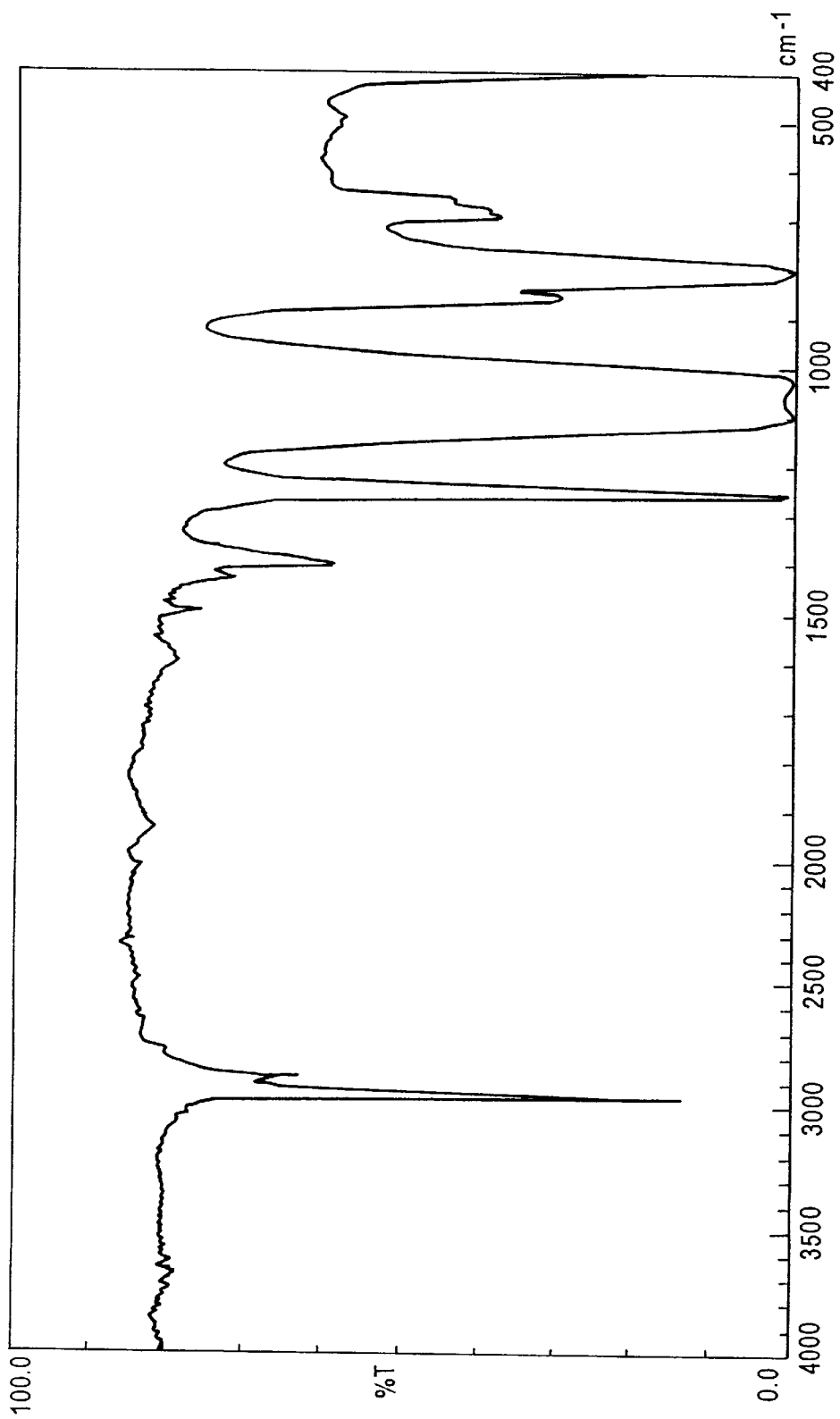
FIG. 4 shows an IR chart of both ends-mercaptomethylphenyl group-containing polysiloxane prepared in Example 2 according to the present invention.
Figure 5:
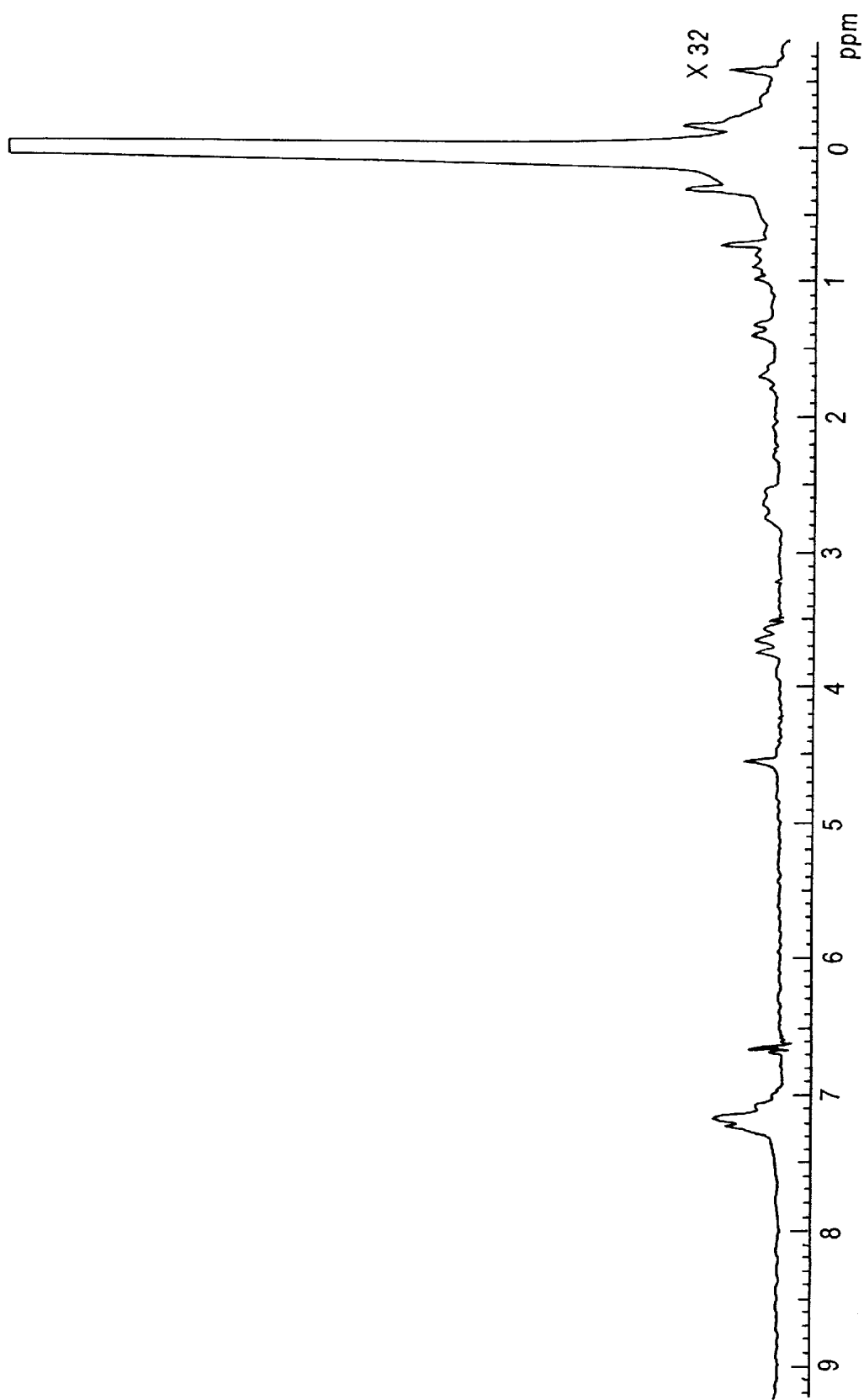
FIG. 5 shows a $^1$H-NMR chart of both ends-mercaptomethylphenyl group-containing polysiloxane prepared in Example 2 according to the present invention.

This product had a viscosity of 134 (cSt/25° C.), a mercapto value of 4663 g/mol, a sulfur content of 0.70 wt %, a number average molecular weight of 6300 which was reduced to polystyrene and a dispersion degree of 1.53. It was confirmed from an IR chart shown in FIG. 4 and a $^1$H-NMR chart shown in FIG. 5 that this product was both ends-mercaptomethylphenyl group-containing dimethylpolysiloxane.

Reference Example 3

Production of Both Ends-Chloromethylphenyl Group-Containing Dimethylpolysiloxane Having a Number Average Molecular Weight of About 10,000:

A four neck flask of 300 ml equipped with a magnetic stirrer, a cooling tube, a thermometer and a dropping funnel was charged with 1 g of the acid ion exchange resin DIAION RCP 160M and 50 g of toluene and azeotropically dewatered until the moisture concentration reached 100 ppm or less. After leaving the flask cooling down to a room temperature, put therein were 45.7 g of octamethylcyclotetrasiloxane and 5 g of the both ends-chloromethylphenyl group-containing dimethylpolysiloxane having a number average molecular weight of 950 obtained in Reference Example 1, and the temperature was elevated up to 70° C. to continue the reaction for 6 hours. After cooling down the reaction liquid, the acid ion exchange resin was filtered off. The solvent and volatile matters were distilled off from the filtrate under reduced pressure by means of an evaporator to obtain 43 g of a pale yellow, transparent liquid.

It was confirmed from the analytical results of NMR, IR and GPC that this product was both ends-chloromethylphenyl group-containing dimethylpolysiloxane having a number average molecular weight of about 10,000.

Example 3

Production of Both Ends-Mercaptomethylphenyl Group-Containing Dimethylpolysiloxane Having a Number Average Molecular Weight of About 10,000:

A 200 ml flask equipped with a magnetic stirrer, a cooling tube and a dropping funnel was charged with 20 g of the both ends-chloromethylphenyl group-containing dimethylpolysiloxane having a number average molecular weight of about 10,000 described in Reference Example 3, 0.32 g of sodium hydrogensulfide and 60 g of 2-propanol. This mixture was heated to 40° C. and stirred for 24 hours while heating.

2-Propanol was distilled off from the reaction liquid by means of an evaporator, and the concentrate was diluted with 20 g of toluene and then filtered. Toluene was distilled off from the filtrate by means of an evaporator. After finishing distillation, resulting turbidity was filtered off to obtain 13.8 g of a viscous liquid.

Figure 6:
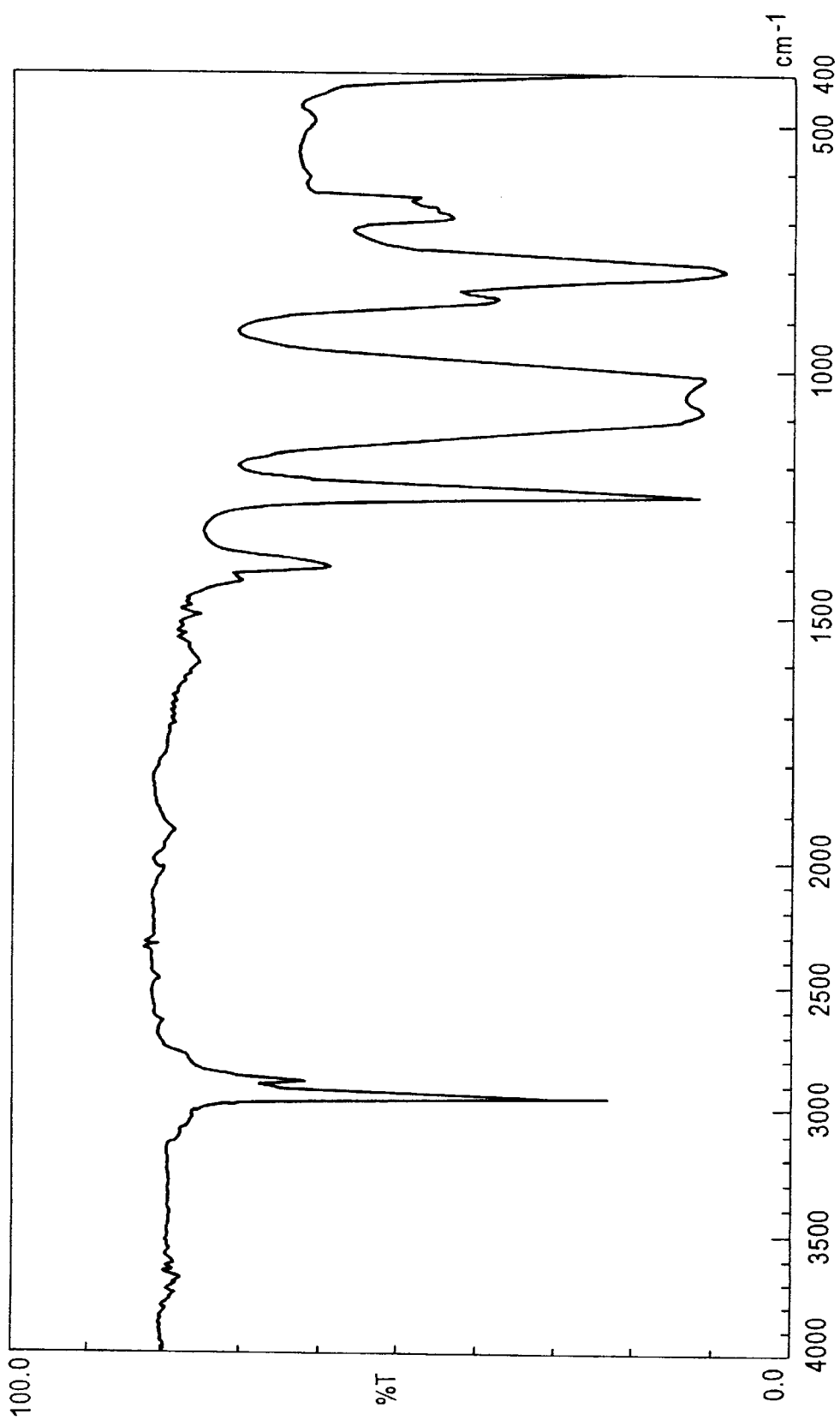
FIG. 6 shows an IR chart of both ends-mercaptomethylphenyl group-containing polysiloxane prepared in Example 3 according to the present invention.
Figure 7:
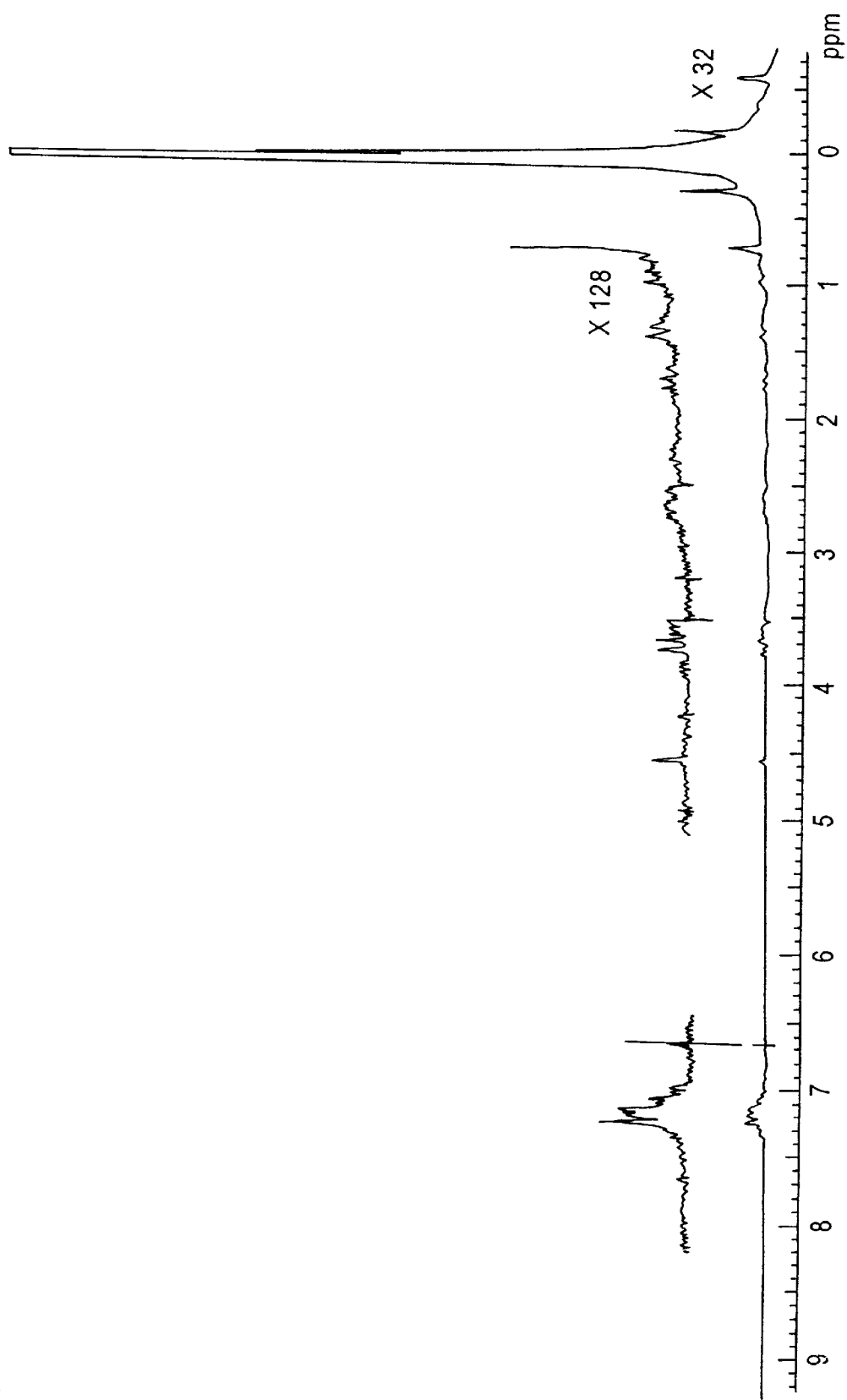
FIG. 7 shows a $^1$H-NMR chart of both ends-mercaptomethylphenyl group-containing polysiloxane prepared in Example 3 according to the present invention.

This product had a viscosity of 449 (cSt/25° C.), a mercapto value of 8737 g/mol, a sulfur content of 0.40 wt %, a number average molecular weight of 10,560 which was reduced to polystyrene and a dispersion degree of 1.86. It was confirmed from an IR chart shown in FIG. 6 and a $^1$H-NMR chart shown in FIG. 7 that this product was both ends-mercaptomethylphenyl group-containing dimethylpolysiloxane.

Reference Example 4
Production of Single End-Chloromethylphenyl Group-Containing Dimethylpolysiloxane Having a Number Average Molecular Weight of About 2,000:

A four neck flask of 300 ml equipped with a magnetic stirrer, a cooling tube, a thermometer and a dropping funnel was charged with 100 g of dimethylpolysiloxane with a number average molecular weight of 1,000 having an SiH group at a single end, and dry air was blown thereinto. The solution temperature was elevated up to 60° C., and 5 micro liter of a 5 wt % toluene solution of a platinum catalyst was put therein. Then, a homogeneous solution of 3.9 g of chloromethylstyrene and 0.2 g of t-butylcatechol was dropwise added from the dropping funnel in 30 minutes. The reaction liquid was ripened for one hour and then cooled down, and 200 g of methanol was added to 120 g of the reaction liquid to extract unreacted chloromethylstyrene. This operation was repeated four times. The solvent and volatile matters were distilled off from the toluene phase under reduced pressure by means of an evaporator to obtain 92.8 g of a pale yellow, transparent liquid.

It was confirmed from the analytical results of NMR, IR and GPC that this product was single end-chloromethylphenyl group-containing dimethylpolysiloxane having a number average molecular weight of about 2,000.

Example 4
Production of Single End-Mercaptomethylphenyl Group-Containing Dimethylpolysiloxane Having a Number Average Molecular Weight of About 2,000:

A 500 ml flask equipped with a magnetic stirrer, a cooling tube, a thermometer and a dropping funnel was charged with 50 g of the single end-chloromethylphenyl group-containing dimethylpolysiloxane having a number average molecular weight of about 2,000 described in Reference Example 4, 2.1 g of sodium hydrogensulfide and 150 g of 2-propanol. This mixture was heated to 40° C. and stirred for 24 hours while heating at the same temperature.

Turbidity produced in the reaction liquid was filtered off, and 2-propanol was distilled off from the filtrate under reduced pressure by means of an evaporator. After finishing distillation, resulting turbidity was filtered off to obtain 49.2 g of a liquid.

Figure 8:
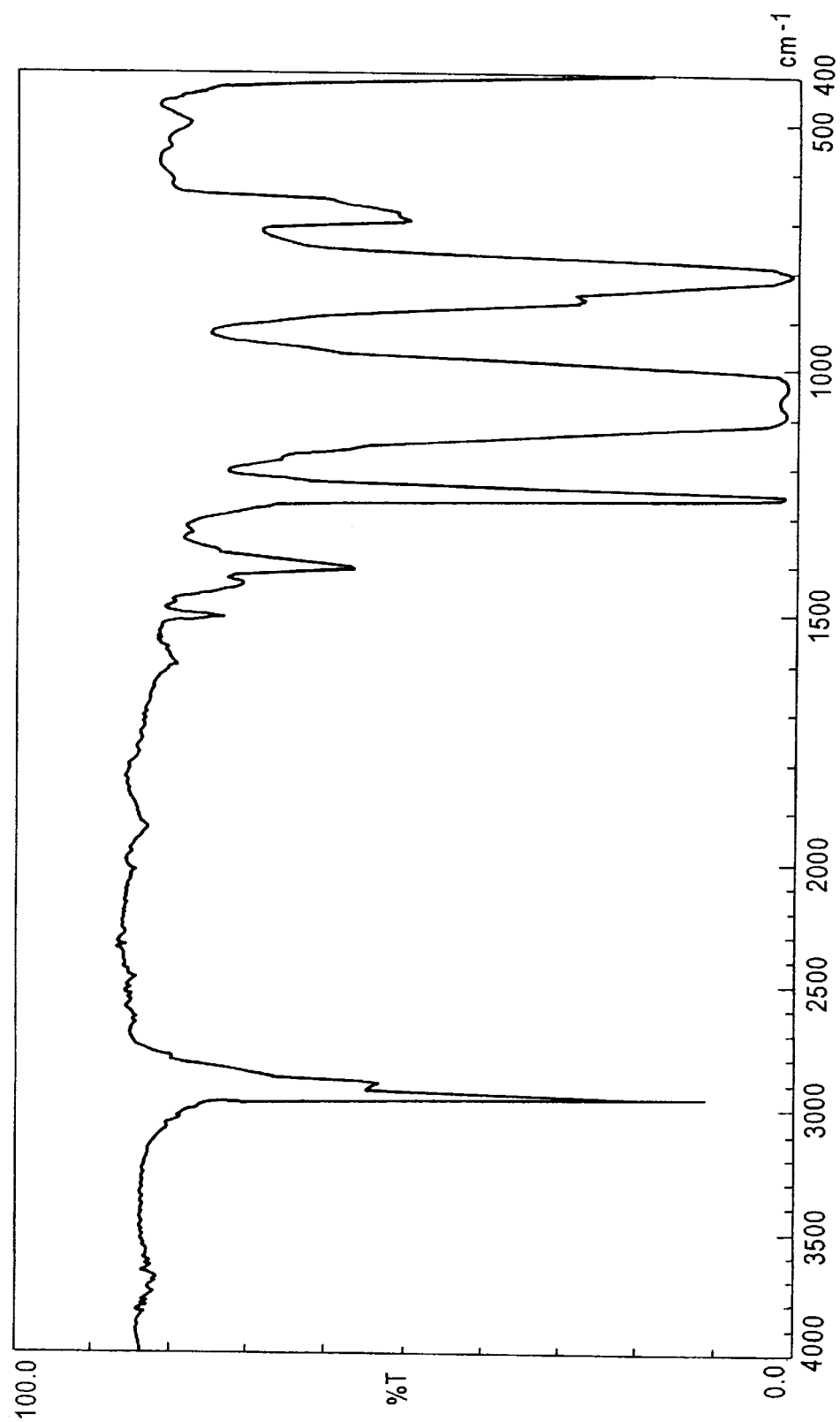
FIG. 8 shows an IR chart of both ends-mercaptomethylphenyl group-containing polysiloxane prepared in Example 4 according to the present invention.
Figure 9:
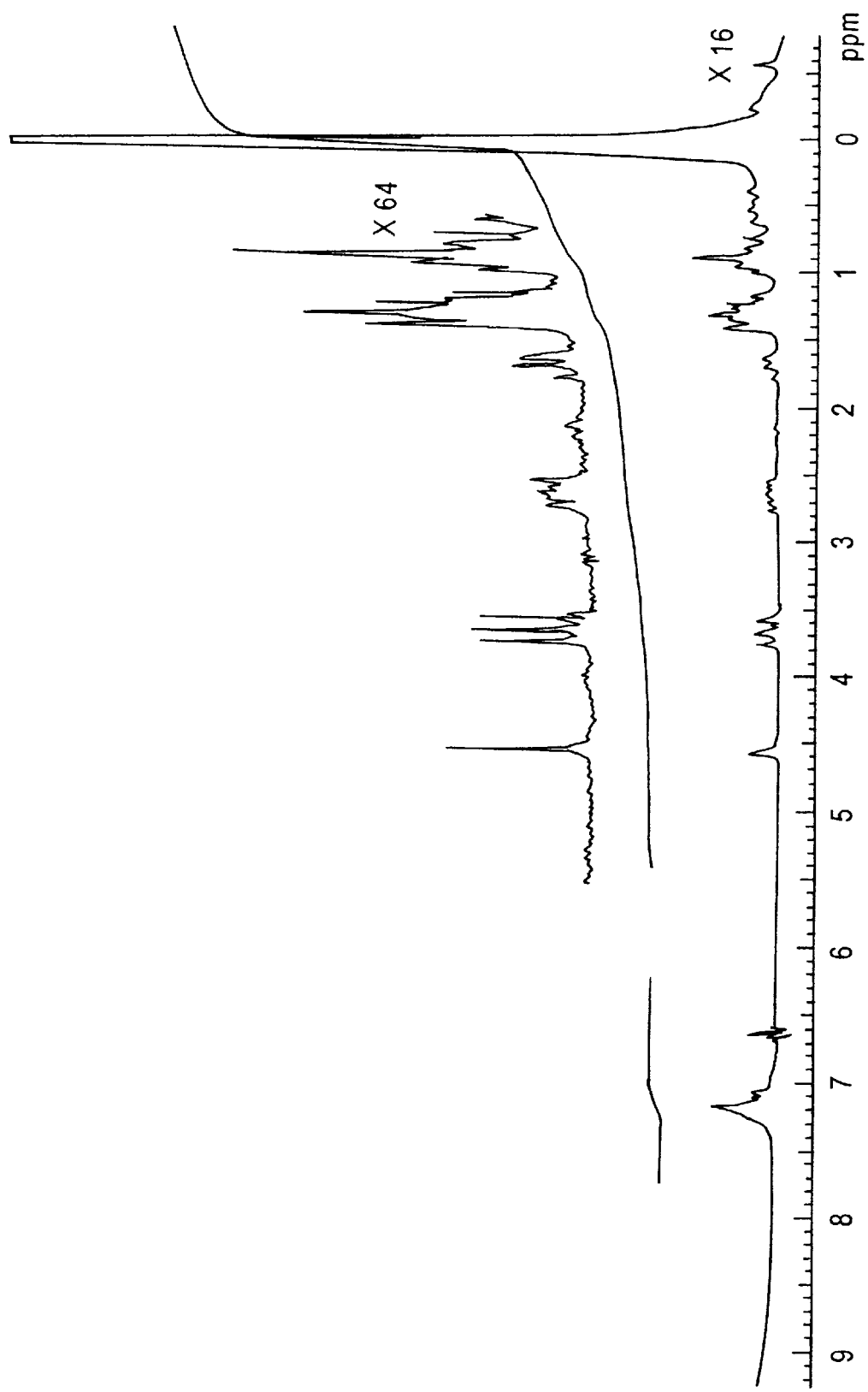
FIG. 9 shows a $^1$H-NMR chart of both ends-mercaptomethylphenyl group-containing polysiloxane prepared in Example 4 according to the present invention.

This product had a viscosity of 22 (cSt/25° C.), a mercapto value of 3704 g/mol, a sulfur content of 1.18 wt %, a number average molecular weight of 1940 which was reduced to polystyrene and a dispersion degree of 1.20. It was confirmed from an IR chart shown in FIG. 8 and a $^1$H-NMR chart shown in FIG. 9 that this product was single end-mercaptomethylphenyl group-containing dimethylpolysiloxane.

Reference Example 5
Production of Single End-Chloromethylphenyl Group-Containing Dimethylpolysiloxane Having a Number Average Molecular Weight of About 6,000:

A four neck flask of 300 ml equipped with a magnetic stirrer, a cooling tube, a thermometer and a dropping funnel was charged with 100 g of dimethylpolysiloxane with a number average molecular weight of 5,000 having an SiH group at a single end, and dry air was blown thereinto. The solution temperature was elevated up to 60° C., and 5 micro liter of a 5 wt % toluene solution of a platinum catalyst was put therein. Then, a homogeneous solution of 3.9 g of chloromethylstyrene and 0.2 g of t-butylcatechol was dropwise added from the dropping funnel in 30 minutes. The reaction liquid was ripened for 1.5 hour and then cooled down, and 200 g of methanol was added to 95 g of the reaction liquid to extract unreacted chloromethylstyrene. This operation was repeated four times. The solvent and volatile matters were distilled off from the toluene phase under reduced pressure by means of an evaporator to obtain 78 g of a pale yellow, transparent liquid.

It was confirmed from the analytical results of NMR, IR and GPC that this product was single end-chloromethylphenyl group-containing dimethylpolysiloxane having a number average molecular weight of about 6,000.

Example 5
Production of Single End-Mercaptomethylphenyl Group-Containing Dimethylpolysiloxane Having a Number Average Molecular Weight of About 6,000:

A four neck flask of 500 ml equipped with a magnetic stirrer, a cooling tube, a thermometer and a dropping funnel was charged with 50 g of the single end-chloromethylphenyl group-containing dimethylpolysiloxane having a number average molecular weight of about 6,000 described in Reference Example 5, 1.64 g of sodium hydrogensulfide and 150 g of 2-propanol. This mixture was heated to 40° C. and stirred for 24 hours while heating at the same temperature.

Turbidity produced in the reaction liquid was filtered off, and 2-propanol was distilled off from the filtrate under reduced pressure by means of an evaporator to obtain 49.9 g of a liquid.

Figure 10:
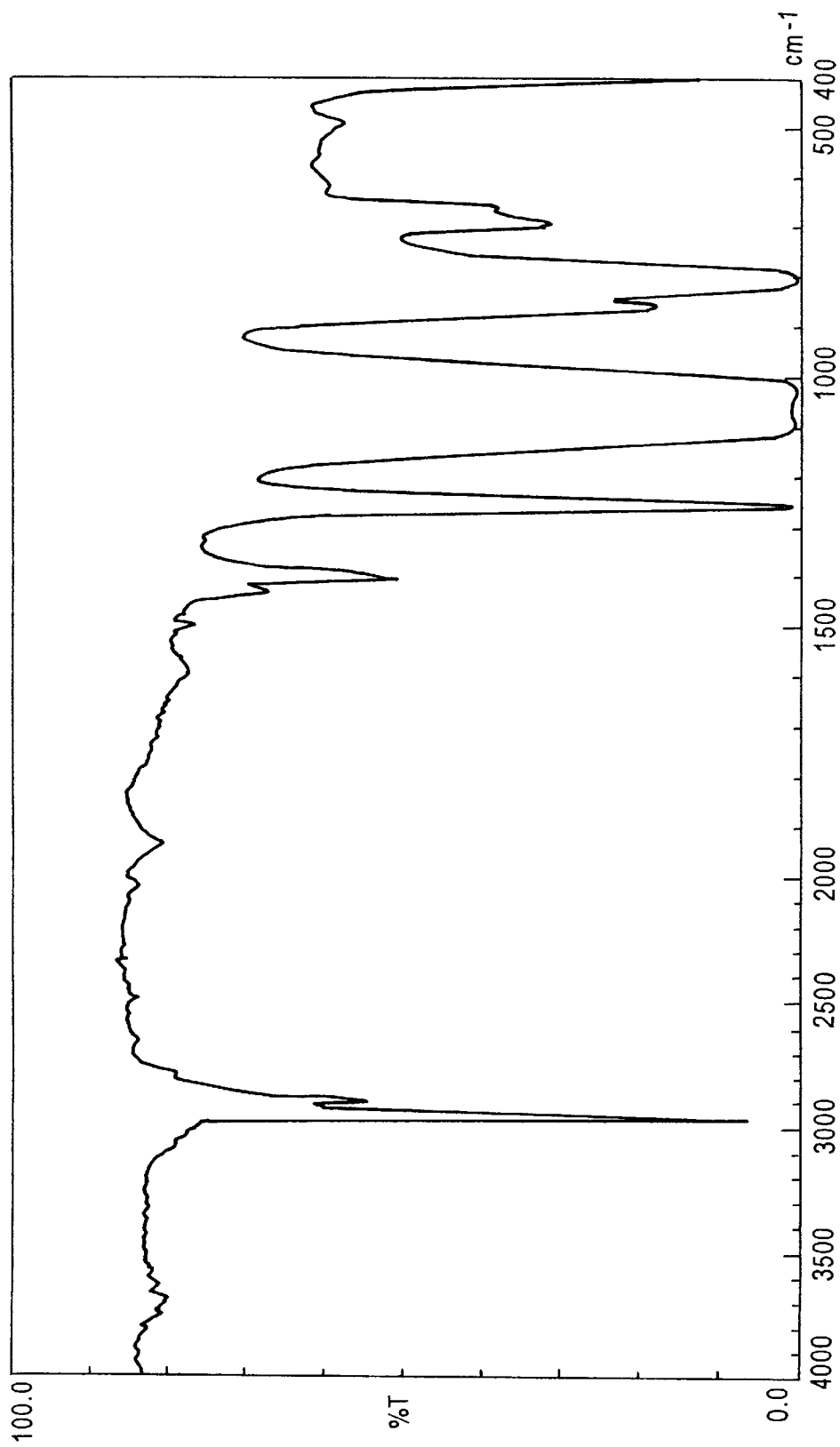
FIG. 10 shows an IR chart of both ends-mercaptomethylphenyl group-containing polysiloxane prepared in Example 5 according to the present invention.
Figure 11:
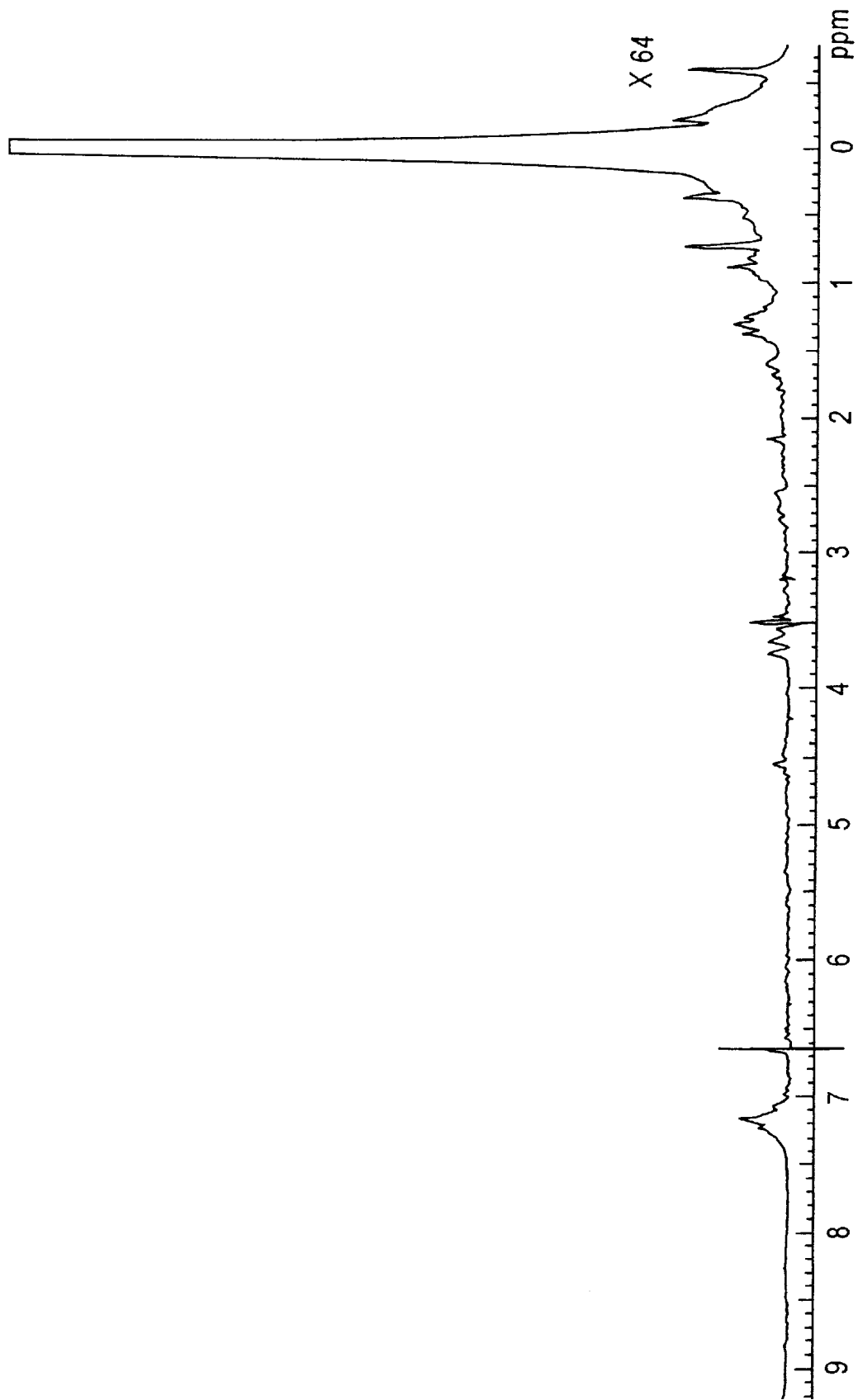
FIG. 11 shows a $^1$H-NMR chart of both ends-mercaptomethylphenyl group-containing polysiloxane prepared in Example 5 according to the present invention.

This product had a viscosity of 88 (cSt/25° C.), a mercapto value of 8911 g/mol, a sulfur content of 0.27 wt %, a number average molecular weight of 6750 which was reduced to polystyrene and a dispersion degree of 1.13. It was confirmed from an IR chart shown in FIG. 10 and a $^1$H-NMR chart shown in FIG. 11 that this product was single end-mercaptomethylphenyl group-containing dimethylpolysiloxane.

Reference Example 6
Production of Single End-Chloromethylphenyl Group-Containing Dimethylpolysiloxane Having a Number Average Molecular Weight of About 9,000:

A four neck flask of 300 ml equipped with a magnetic stirrer, a cooling tube, a thermometer and a dropping funnel was charged with 100 g of dimethylpolysiloxane with a number average molecular weight of 5,000 having an SiH group at a single end, and dry air was blown thereinto. The solution temperature was elevated up to 60° C., and 5 micro liter of a 5 wt % toluene solution of a platinum catalyst was put therein. Then, a homogeneous solution of 3.9 g of chloromethylstyrene and 0.2 g of t-butylcatechol was dropwise added from the dropping funnel in 30 minutes. The reaction liquid was ripened for 21 hours and then cooled down, and 200 g of methanol was added to 102.3 g of the reaction liquid to extract unreacted chloromethylstyrene. This operation was repeated four times. The solvent and volatile matters were distilled off from the toluene phase under reduced pressure by means of an evaporator to obtain 97.0 g of a pale yellow, transparent liquid.

It was confirmed from the analytical results of NMR, IR and GPC that this product was single end-chloromethylphenyl group-containing dimethylpolysiloxane having a number average molecular weight of about 9,000.

Example 6
Production of Single End-Mercaptomethylphenyl Group-Containing Dimethylpolysiloxane Having a Number Average Molecular Weight of About 9,000:

A four neck flask of 500 ml equipped with a magnetic stirrer, a cooling tube, a thermometer and a dropping funnel was charged with 50 g of the single end-chloromethylphenyl group-containing dimethylpolysiloxane having a number average molecular weight of about 9,000 described in Reference Example 6, 0.46 g of sodium hydrogensulfide and 150 g of 2-propanol. This mixture was heated to 40° C. and stirred for 24 hours while heating at the same temperature. Turbidity produced in the reaction liquid was filtered off, and 2-propanol was distilled off from the filtrate under reduced pressure by means of an evaporator to obtain 49.5 g of a liquid.

Figure 12:
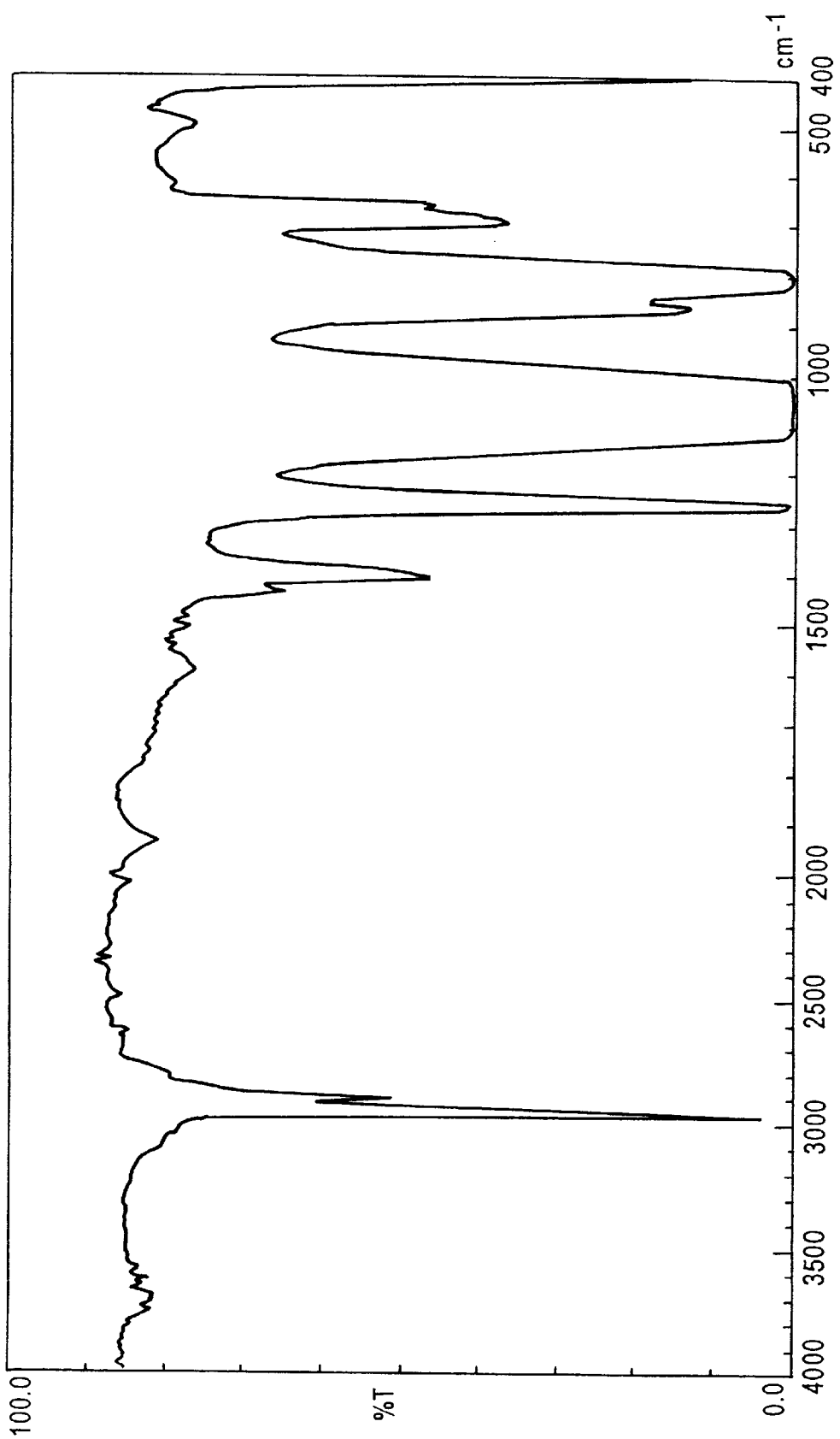
FIG. 12 shows an IR chart of both ends-mercaptomethylphenyl group-containing polysiloxane prepared in Example 6 according to the present invention.
Figure 13:
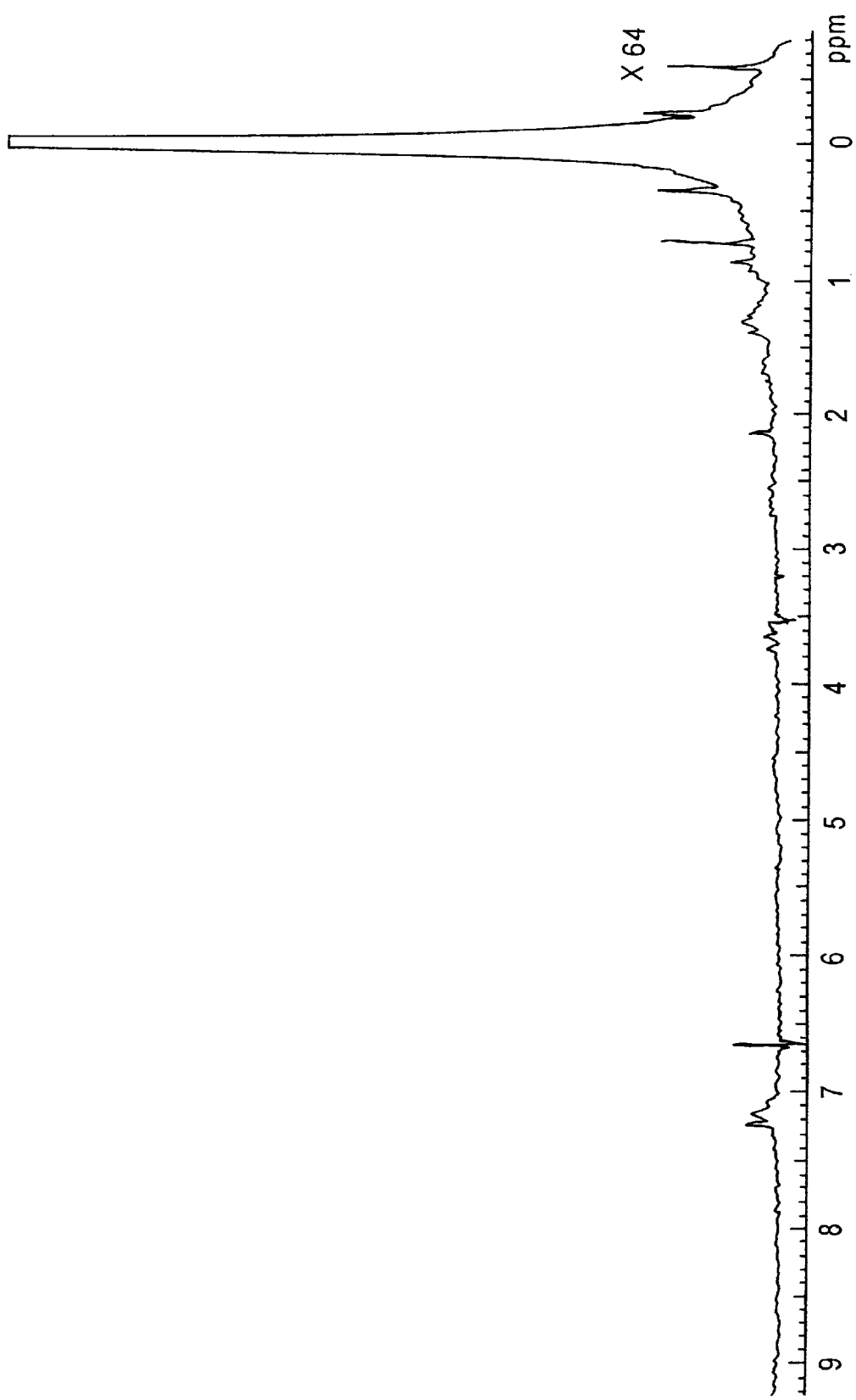
FIG. 13 shows a $^1$H-NMR chart of both ends-mercaptomethylphenyl group-containing polysiloxane prepared in Example 6 according to the present invention.

This product had a viscosity of 155 (cSt/25° C.), a mercapto value of 11392 g/mol, a sulfur content of 0.21 wt %, a number average molecular weight of 9980 which was reduced to polystyrene and a dispersion degree of 1.12. It was confirmed from an IR chart shown in FIG. 12 and a $^1$H-NMR chart shown in FIG. 13 that this product was single end-mercaptomethylphenyl group-containing dimethylpolysiloxane.

If mercaptomethylphenyl group-containing diorganopolysiloxane containing a mercaptomethylphenyl group and having an alkyl group according to the present invention is used, diorganopolysiloxane can be introduced into an organic resin having a hydroxyl residue, whereby a graft copolymer can be prepared, and an AB type block copolymer of the above diorganopolysiloxane with poly (methacrylic acid ester) can be synthesized.

What is claimed is:

1. A mercaptomethylphenyl group-containing diorganopolysiloxane compound represented by the following (1)

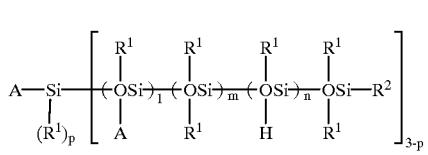

wherein $R^1$ represents methyl or phenyl; $R^2$ represents a linear or branched alkyl group having 1 to 6 carbon atoms, a phenyl group or A; l represents an integer of 0 to 500; m represents an integer of 0 to 1,000; n represents an integer of 0 to 500; p represents an integer of 0 to 2; and A is a group represented by Formula (2):

(2)

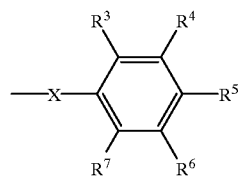

wherein X represents a linear or branched alkylene group having 2 to 20 carbon atoms; at least one of $R^3$, $R^4$, $R^5$, $R^6$ and $R^7$ represents mercaptomethyl, and the remaining groups each represent a hydrogen atom or a linear or branched alkyl group having 1 to 20 carbon atoms.

2. A single end-mercaptomethylphenyl group-containing diorganopolysiloxane compound, wherein in Formula (1) described in claim 1, $R^2$ is a linear or branched alkyl group having 1 to 6 carbon atoms or a phenyl group; l is 0; p is 2; and the number average molecular weight falls in a range of 500 to 200,000.

3. A both ends-mercaptomethylphenyl group-containing diorganopolysiloxane, wherein in Formula (1) described in claim 1, $R^2$ is A; l is 0; p is 2; and the number average molecular weight falls in a range of 500 to 200,000.

4. A production process for a mercaptomethylphenyl group-containing diorganopolysiloxane compound characterized by reacting a chloromethylphenyl group-containing diorganopolysiloxane compound represented by the following Formula (3) with a mercapto-providing agent:

(3)

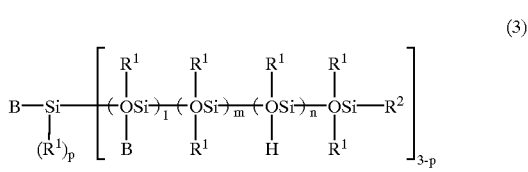

wherein $R^1$ represents methyl or phenyl; $R^2$ represents a linear or branched alkyl group having 1 to 6 carbon atoms, a phenyl group or B; l represents an integer of 0 to 500; m represents an integer of 0 to 1,000; n represents an integer of 0 to 500; p represents an integer of 0 to 2; and B is a group represented by Formula (4):

(4)

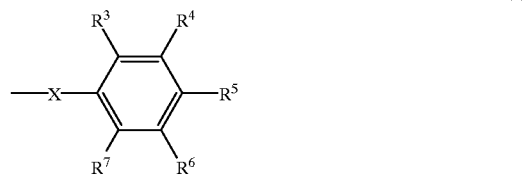

wherein X represents a linear or branched alkylene group having 2 to 20 carbon atoms; at least one of $R^3$, $R^4$, $R^5$, $R^6$ and $R^7$ represents chloromethyl, and the remaining groups each represent a hydrogen atom or a linear or branched alkyl group having 1 to 20 carbon atoms.

5. A production process for a single end-mercaptomethylphenyl group-containing diorganopolysiloxane compound, wherein the compound represented by Formula (3) as described in claim 4 is a single end-chloromethylphenyl group-containing diorganopolysiloxane in which $R^2$ is a linear or branched alkyl group having 1 to 6 carbon atoms or a phenyl group; p is 2; and a number average molecular weight falls in a range of 500 to 200,000.

6. A production process for a both ends-mercaptomethylphenyl group-containing diorganopolysiloxane compound, wherein the compound represented by Formula (3) as described in claim 4 is a both ends-chloromethylphenyl group-containing diorganopolysiloxane in which $R^2$ is B; p is 2; and a number average molecular weight falls in a range of 500 to 200,000.

* * * * *